(12) United States Patent
Caldwell

(10) Patent No.: US 10,134,018 B2
(45) Date of Patent: *Nov. 20, 2018

(54) FLEXIBLE OPEN ORIGINATION

(71) Applicant: MX TECHNOLOGIES, INC., Lehi, UT (US)

(72) Inventor: John Ryan Caldwell, Provo, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 238 days.

This patent is subject to a terminal disclaimer.

(21) Appl. No.: 13/815,562

(22) Filed: Mar. 8, 2013

(65) Prior Publication Data

US 2014/0258116 A1 Sep. 11, 2014

(51) Int. Cl.
| | | |
|---|---|---|
| G06Q 20/00 | (2012.01) | |
| G06Q 20/10 | (2012.01) | |
| G06Q 20/32 | (2012.01) | |

(52) U.S. Cl.
CPC ....... *G06Q 20/108* (2013.01); *G06Q 20/3221* (2013.01); *G06Q 20/3223* (2013.01)

(58) Field of Classification Search
CPC .......................... G06Q 40/02; G06Q 20/3223
See application file for complete search history.

(56) References Cited

U.S. PATENT DOCUMENTS

| | | | | |
|---|---|---|---|---|
| 7,529,710 | B1 * | 5/2009 | Clower et al. | 705/39 |
| 7,873,573 | B2 * | 1/2011 | Realini | G06Q 20/04 235/379 |
| 8,249,965 | B2 * | 8/2012 | Tumminaro | G06Q 20/12 705/35 |
| 9,965,757 | B2 * | 5/2018 | Bhinder | G06Q 20/3221 |
| 2007/0053518 | A1 * | 3/2007 | Tompkins et al. | 380/270 |
| 2007/0061300 | A1 | 3/2007 | Ramer et al. | |
| 2007/0255662 | A1 * | 11/2007 | Tumminaro | G06Q 20/027 705/79 |
| 2011/0028160 | A1 | 2/2011 | Roeding et al. | |
| 2011/0302083 | A1 * | 12/2011 | Bhinder | G06Q 20/32 705/44 |
| 2012/0035990 | A1 | 2/2012 | Lewis et al. | |
| 2012/0254002 | A1 * | 10/2012 | Kundagrami et al. | 705/35 |
| 2012/0265604 | A1 | 10/2012 | Corner et al. | |
| 2015/0019307 | A1 | 1/2015 | Girard et al. | |
| 2015/0281222 | A1 | 10/2015 | Burch et al. | |

OTHER PUBLICATIONS

Wallen, Jack, "Track your finances from your mobile with Mint", Jun. 13, 2012, TechRepublic.
U.S. Appl. No. 14/494,560 Non-Final Office Action dated Jun. 6, 2017.

* cited by examiner

*Primary Examiner* — Bruce I Ebersman
(74) *Attorney, Agent, or Firm* — Kunzler, PC

(57) ABSTRACT

In the field of banking and financial services, a flexible Open Origination allows any type of mobile, internet, online, personal financial management software, finance tool, or other useful function, device or software, that a bank or financial institution provides to account holders, and offers that same functionality that allows any user regardless of account status. Non-account holders can download and utilize the Banking Software in question in order to enjoy its features, an in order to become familiar with the experience of doing business with the bank or financial institution that provides the software. This method, system and software allows any user, regardless of where his/her accounts are located, to use the software and benefit from its functionality.

15 Claims, 2 Drawing Sheets

FLEXIBLE OPEN ORIGINATION

BACKGROUND

In the prior art, banks, credit unions and other financial institutions (hereinafter "FI") often provided software for their account holders to conduct banking transactions and other financial transactions and otherwise manage their finances from a computer or mobile electronic device, such as a laptop computer, notebook computer, personal data assistant, smart phone or other electronic device that a person can readily transport with him/her (hereinafter collectively, "Computing Device"). Such banking software allowed users to conduct various types of financial transactions, make deposits, transfers, pay bills, wire transfers, view accounts, etc. (hereinafter "Standard Banking Software"). In fact, many account holders insist that their FI provide Standard Banking Software, or the account holder will move funds, loans, their relationship or other connections to a new FI.

Standard Banking Software can also be dovetailed with, or include, Personal Financial Management ("PFM") software that provides additional functionality, such as keeping track of income, expenses, budgeting, net worth analysis, etc. PFM can also be configured to manage the financial affairs of an individual with accounts at various financial institutions.

When an individual who does not have an account at a particular FI, that user either cannot use the Standard Banking Software at all, or can only use the Standard Banking Software for very simple, typically non-financial, functions such as locating a local branch of the bank or financial institution. Therefore persons without an account at a particular FI have little to no idea what software services and functionality that FI may offer. As a consequence, the non-account holder end user consumer has very limited options in Standard Banking Software, and rather than having the ability to choose the software of his or her liking, the end user is restricted to that Standard Banking Software offered by his or her particular banking institution. As a potential customer of a particular FI, the non-account holder has no significant or true "hands on" way to develop an impression of the experience of using that FI without actually opening accounts, transferring money and engaging in various financial transactions to enjoy an actual account holder experience.

The FI may have the best (or worst) Standard Banking Software available and the most positive (or worst) user experience, but potential customers simply do not have an optimal way to truly confirm or directly experience that in advance. The primary method for customers to distinguish among banks and financial institutions (and financial software, if any) is sales slogans, trademarks/logos, fee structures and quick snippets on TV, billboards, radio or the like that attempts to partially describe their software offering. There is presently no mode of allowing potential new users, specifically non-account holders, to gain access to the software that a bank has to offer, as Standard Banking Software is reserved for existing account holders of that particular FI without the time-consuming, and often undesirable and difficult process of opening an account at a new FI, or other time-consuming research method.

Similarly, FIs presently have no opportunity (or limited opportunities) to, in a near unrestricted manner, contribute to the banking community and to broaden their potential customer base by offering the near complete or totally complete functionality (or a partial set thereof), features and benefits of the particular Standard Banking Software that they have developed or otherwise offer to their account holders. Although some FIs see the Standard Banking Software merely as a necessary evil in order to retain account holders, it is possible that in the future others may wish to provide the best and most robust Standard Banking Software possible to attract and serve customers, and offer such software to the general population, in order to build their brand or altruistically serve the banking community.

SUMMARY

For the fields of banking, financial services and PFM, a flexible and Open Origination has been invented that supports an entity, such as an FI, to provide any end-user, not just end-users that have existing accounts or connections to the FI, use of Open Origination Financial Software that the FI provides. This allows that end-user to view transactional banking or transactional detail (preferably that was gathered, acquired or generated in a non-manual way), or views that were created using the above-mentioned transaction detail, from accounts or relationships that may or may not be related to the FI providing the Financial Software, via that Financial Software. The Open Origination Financial Software may include any software that is in any way financial in nature regardless of how it is delivered, consumed, packaged or referenced by any industry or party.

The transactional detail provided by the Open Origination Financial Software may include certain information such as (but is not limited to) date of transaction, amount of the transaction, description of transaction and category, etc. The Financial Software may also provide other functions that either are or could be derived from that transactional detail. Those functions may include, but are not limited to, capabilities such as account balance, spending pie, other category breakdown and budgeting information, to name a few.

This certain Open Origination Financial Software will provide at its most basic level transactional detail (that was gathered, acquired or generated in a non-manual way) which may include certain information such as (but is not limited to) date of transaction, amount of the transaction, description of transaction and category, etc. The Open Origination Financial Software may also provide other functions, but is not limited to, capabilities such as account balance, spending category and budgeting information, to name a few.

Specifically, non-account holders and account holders of a particular FI alike, can open, download and utilize the Open Origination Financial Software in order to enjoy its (full, nearly full or certain aspects of) functionality and features, and be further able to become familiar with the experience of doing business with the particular FI that provides the Financial Software.

This newly invented method, system, and software allows any user, regardless of where his/her accounts are held, to use the Open Origination Financial Software provided by an FI to both its account holders and the general financial services customer community, and benefit from the functionality of the Financial Software. This invention provides a previously non-existent intermediate step of a user downloading and actually using the functionality (whether complete or partial) of new Open Origination Financial Software from a FI even by those who do not have an account with the FI. Through this invention, Open Origination Financial Software allows any individual to access certain of their financial information within the Open Origination Financial Software and use the Financial Software, at its minimum, to view transactional detail as explained above, but could also use the Open Origination Financial Software to access other capabilities that such software may have or that a FI provides, by making the Open Origination Financial Software accessible\by both account holders and non-account holders alike. The open origination function, specifically allows even non-account holders to open, download and/or use the Open Origination Financial Software as they desire and to manage certain of (or all as the case may be) their financial circumstances regardless of whether their accounts are held with other FIs.

Offering that certain software functionality to the entire banking community, including an FI's present account holders and potential future account holders, could be an excellent venue for banks and other financial institutions to introduce themselves and a significant part of their software offering to potential future account holders. Further, it results in providing end consumers with a wider range of choices in software. They can choose from Open Origination Financial Software or Standard Banking Software from other FIs.

As each FI usually develops and pays for Standard Banking Software anyway, Open Origination Financial Software will impose little additional cost or burden on the FI. A very unrestricted and easy user adoption of its Standard Banking Software (converted to Open Origination Financial Software) or an aspect or subset thereof are easily made available, and the marketing and conversion benefit could be enormous. End-users who do not have existing accounts or relationships with the particular FI offering the Open Origination Financial Software benefit from being able to fully, or near fully, utilize that banks software that is normally reserved for only end-users with existing accounts or the like with that new FI. The new FI benefits by being able to much more easily give end-users, who do not have a relationship, existing account or the like with them, a way to experience a great FI. The potential customers can enjoy a very impressive software offering that is modern, highly capable, well-designed and potentially much better than whatever that end-user's existing FI's Standard Banking Software offering is. This can result in a better general brand for the new FI, the potential desire of the end-user to switch their relationship and associated items to this new FI, and provides a constant avenue for the new FI to understand and market to this potential new end-user (potential customer). This understanding, due to the massive amount of highly relevant data, should be of extreme value to this new FI. A lot of the data should be highly contextual and that will allow for highly contextual and personalized marketing.

Since the invented method of delivery of functionality is primarily expected to be via software, this data and marketing can be delivered in a manner and time as determined is best optimized for desired end-user action to be likely. This action could include, but is not limited to, account opening, account conversion, loan conversion, billpay switching, direct deposit switching, important outside linked account switching (such as PayPal, eTrade, ShareBuilder, etc), and the switching of other banking products or offerings. If properly used, this method of an new FI that does not have an existing relationship with certain non-account holding end-users allowing those non-account holding end-users to use a full or near full offering of their software, could be of immense value to that FI's future (which may include its future profitability and success) and could even prove to be one of if not the most important aspect of their future.

DETAILED DESCRIPTION

Figure 1:
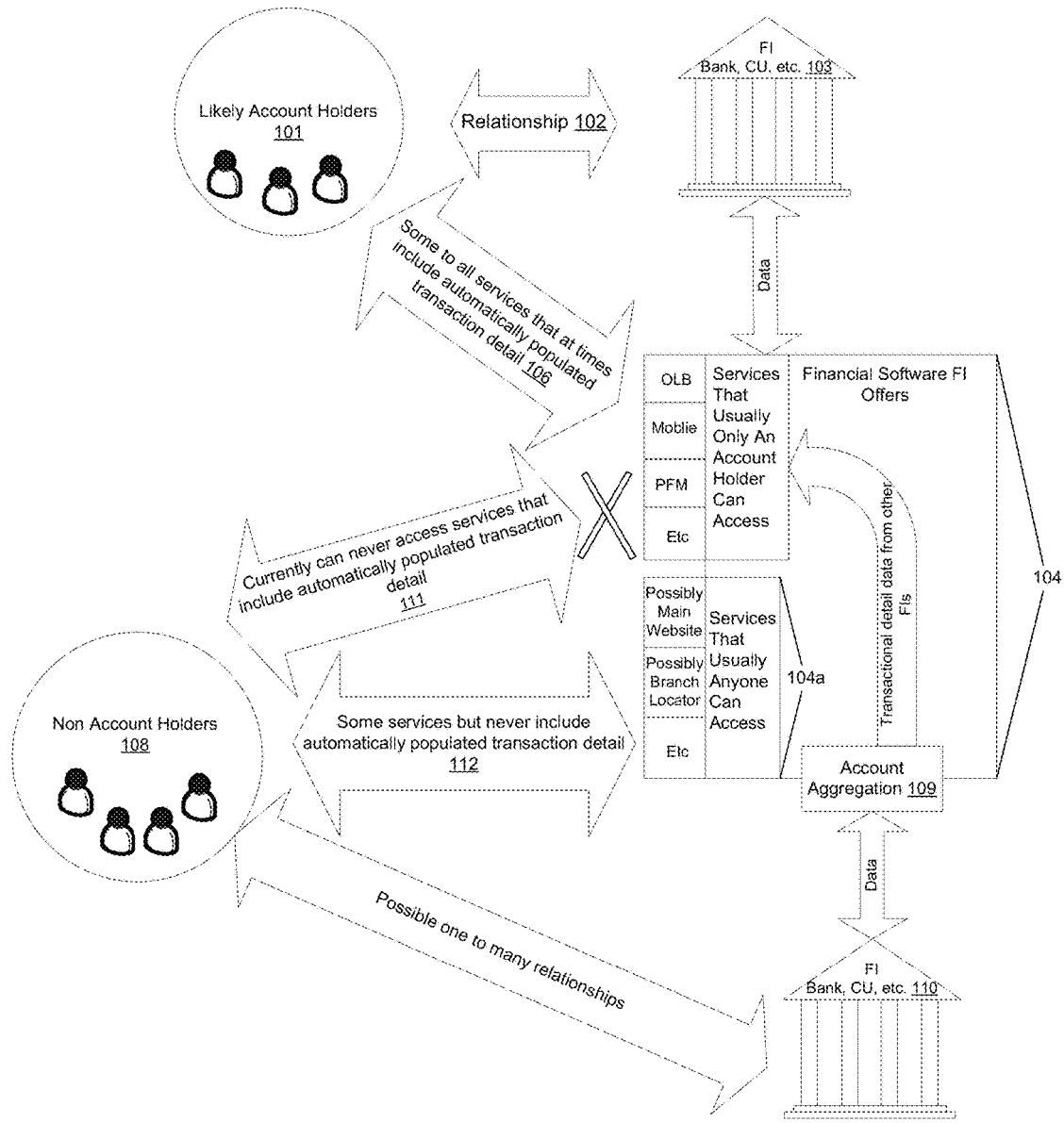
FIG. 1 depicts a prior art banking relationship structure.

Referring to FIG. 1, a prior art banking relationship structure is depicted. The FI 103 has a business relationship 102 with account holders 101. Generally that relationship involves a user setting up an account with the FI, the user depositing money with the FI, the FI providing certain services, facilitating various transactions and possibly charging fees for any myriad of financial services and then in turn potentially paying interest to the account holders based on the value of their financial deposits. In modern banking, a computer system 104 includes Standard Banking Software for remote and/or mobile access by account holders 101. Such Standard Banking Software supports remote or mobile access by account holders. The account holders 101 can use the Standard Banking Software to conduct various financial transactions 106. The Banking Software on the computer system 104 will support remote and mobile banking functions including account viewing, money transfers, bill pay, investing, etc. Account aggregation 109 from third party data sources 110 allows the Standard Banking Software to serve account holders with bill pay, PFM and other transaction support that is not exclusive to the FI 103 but may come from stock brokers, credit unions, other banks, 110, etc. Typically, FIs will allow non-account holders 110 access to the computer system where the Standard Banking Software will provide very minimal services such as allowing the non-account holder to go to the FI's main web page 104a or to use a branch locator function. This abbreviated functionality is not conductive to developing a relationship with those non-account holders 108 who have relationships with other FIs 110, possibly in a many:one relationship.

FIs may recognize that their account holders 101 are a minority of the general public, and that they desire to have an online offering for the general public. In the prior art, as mentioned above, this online offering has been minimal and extremely limited in capabilities. Non-account holders 108 could typically access a bank computer system 104 for the purpose of viewing certain information about the FI and certain product offerings only, and perhaps to use a branch locator or some other similar functionality. However, features, functions or products that require the viewing or using of transactional data (individually or in aggregate), such as online banking, mobile banking, or other financial services functionality was provided only to account holders of that particular FI 108.

The structures and relationships shown in FIG. 1 are simplified for discussion purposes and the diagram is not intended to reflect the full complexity of many banking computer systems.

Figure 2:
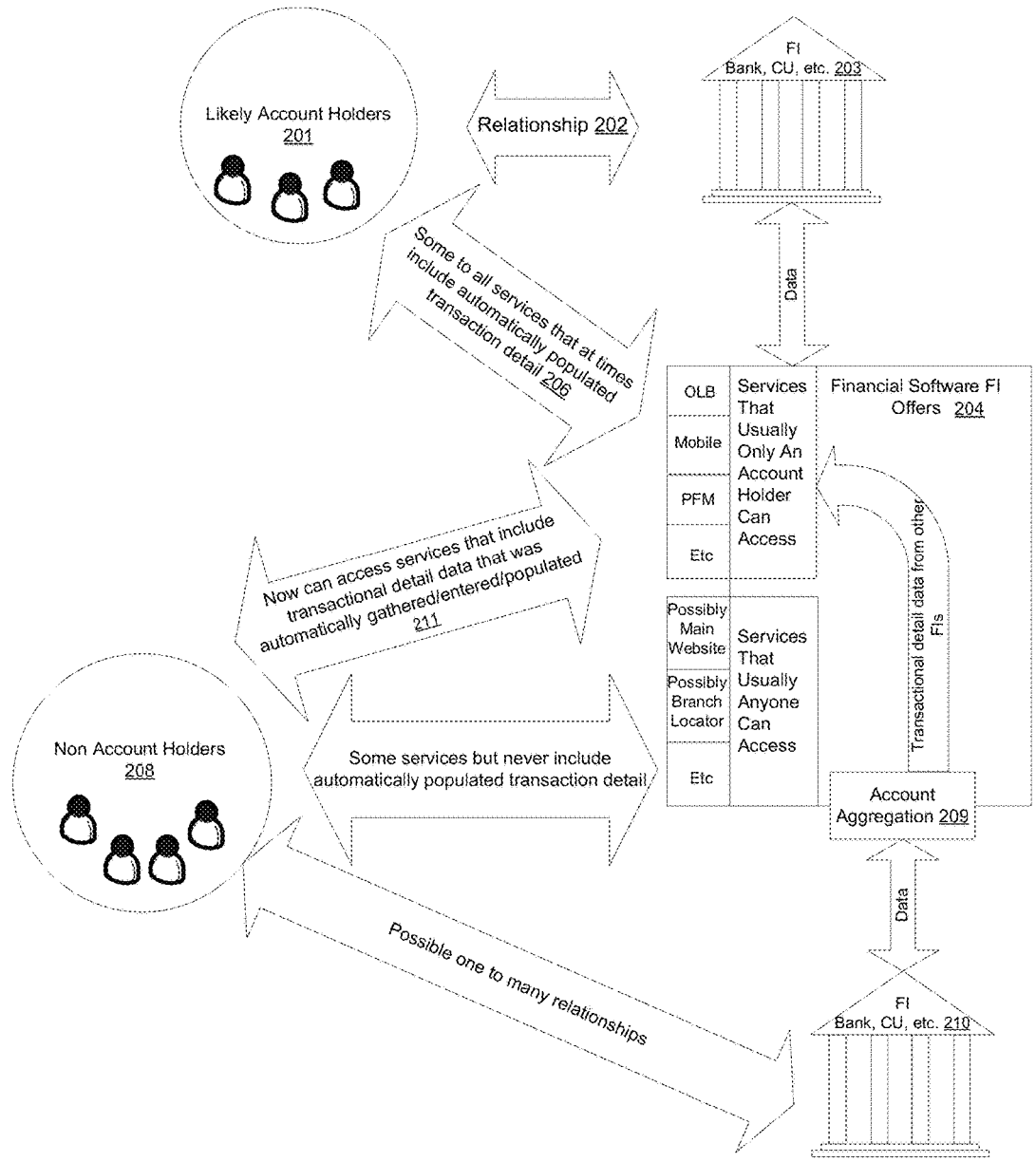
FIG. 2 depicts an example flexible open origination software applied to banking or other FIs.

Referring to FIG. 2, an example implementation of the invention is provided. With the invention in place, now non-account holders 208 in relation 202 to the FI 203 are able to use Open Origination Financial Software 204 to conduct transactions 206 and otherwise utilize the software. The Open Origination Financial Software 204 is built to use or view transactional detail data that is not manually gathered or entered into the Open Origination Financial Software 204. The invention recognizes that some of the non-account holders 201 are likely the FI's desired future customers and are a mechanism by which the FI is likely to grow its business. The invention also recognizes that the entire general public, including non-account holders, are part of a growing trend toward mobile banking, budgeting, personal financial management, net worth analysis, etc. Therefore the invention broadens the FI's reach into new potential users of their product offering that relies on transactional detail data.

The Open Origination Financial Software 204 gathers user data 209 of third party FIs 210 through mechanisms such as account aggregation or other means. Due to such data access, non-account holders 208 of the FI 201 providing the Open Origination Financial Software 204 can now access their various account data and conduct transactions 211 as well as otherwise take advantage of the functionality of the Open Origination Financial Software 204.

In this way, the FI through its computer system or product offering allows both account holders and non-account holder ability to access and/or download the FI's Open Origination Financial Software. The Open Origination Financial Software will include a set of functionality determined by the FI to be desirable, such as, but is not limited to, transactional detail (that was gathered, entered or acquired in a non-manual way) which may include certain information such as (but is not limited to) date of transaction, amount of the transaction, description of transaction and category, etc. The Open Origination Financial Software may also provide other functions, which may include but is not limited to, capabilities such as account balance, net worth calculations, spending and budgeting information or other desirable functionality provided to account holders. The FI may permit the Open Origination Financial Software to be opened, downloaded and utilized, by both account holders and non-account holders alike, remotely through a Computing Device or via any other method such as wirelessly through a mobile electronics device.

The accessibility to download the Open Origination Financial Software, software or app can provide the Computing Device with the access to and functionality of the Financial Software, which may or may not also include desirable features such as mobile banking, investing, budgeting, net worth analysis, bill pay, account viewing, PFM capabilities, etc. The Open Origination Financial Software will permit the user to gain access to the necessary data, aggregate (or generate, acquire and/or populate in some other non-manual method) into the Open Origination Financial Software and to perform the functions supported by such Financial Software. Any users can enjoy the access to and the functionality of the Open Origination Financial Software including ability to access and view the typical transactions that a banking customer might expect.

The invented flexible Open Origination Financial Software allows access through any type of Computing Device to an Open Origination Financial Software, that a FI makes available or offers in some fashion, and makes it accessible to account holders, and then offers that access to any user regardless of account holder status. Accordingly, both account holders and non-account holders, alike, can open, download and utilize the Open Origination Financial Software from a Computing Device in order to enjoy its features and functionality and in turn the non-account holder becomes familiar with the experience of doing business with the FI that provides such Financial Software.

This newly invented method, system and software allows any user, regardless of where his/her accounts are held, to use the software or Open Origination Financial Software and benefit from its functionality (whether complete or partial) and certain (or all) of its feature set. This invention provides a previously non-existent intermediate step of allowing any user to open, download and actually utilize the software application or Open Origination Financial Software offered by a FI even by those who do not have an account with the FI. Through this invention, a Open Origination Financial Software system is offered to any individual on a Computing Device through a particular FI and is provided to both account holders and non-account holders alike. Accordingly, now non-account holders of a particular FI can use the offered by such an FI to manage their financial circumstances, or certain aspects thereof, rather than being limited to the software product offerings, if any, of the FI where their accounts are held.

The invention may be viewed as a system including hardware and software, a stand-alone software app, or a series of steps in a method to accomplish the functions described above.

While the present invention has been described and illustrated in conjunction with a specific embodiment, those skilled in the art will appreciate that variations and modifications may be made without departing from the principles of the invention as herein illustrated, described, and claimed. The present invention may be embodied in other specific forms without departing from its spirit or essential characteristics. The described embodiment is to be considered in all respects as only illustrative, and not restrictive. The scope of the invention is, therefore, indicated by the appended claims, rather than by the foregoing description. All changes which come within the meaning and range of equivalency of the claims are to be embraced within their scope.

The invention claimed is:
1. A method of flexible open origination comprising:
storing an application on a computer system for a financial institution;
receiving an application download request, over the internet, at the computer system from an account holder's smart phone, the account holder having a deposit account at the financial institution;
wirelessly downloading the application to the account holder's smart phone;
automatically exposing account data of the account holder's deposit account stored on the computer system of the financial institution to the application on the account holder's smart phone;
facilitating, through the application on the account holder's smart phone, a full set of banking transaction types by the account holder for the deposit account at the financial institution;
receiving an application download request, over the internet, at the computer system from a non-account holder's smart phone, the non-account holder not having any deposit account at the financial institution, the non-account holder having a plurality of third-party deposit accounts at a plurality of third-party financial institutions;
wirelessly downloading the application to the non-account holder's smart phone;
automatically aggregating account data of the non-account holder's plurality of third-party deposit accounts from storage on third-party computer systems for the plurality of third-party financial institutions to storage on the computer system for the financial institution, the aggregated account data comprising transaction data for the non-account holder that is received from the plurality of third-party financial institutions over the internet;

automatically exposing the aggregated account data to the application on the non-account holder's smart phone such that the non-account holder can view account data for each of the plurality of third-party deposit accounts for the non-account holder within the application; and facilitating, through the application on the non-account holder's smart phone, substantially the same full set of banking transaction types and personal financial management functions by the non-account holder for the third-party deposit account at the third-party financial institution, wherein the facilitating causes the application to present substantially the same full functionality to the non-account holder as the application presents to the account holder, the full set of personal financial management functions comprising one or more of personal budgeting, income tracking, net worth analysis, and account transaction viewing;

offering one or more functions for analyzing the non-account holder's transaction data from the plurality of third-party deposit accounts through the application, the one or more functions comprising determining account balances, generating and presenting a spending pie, transaction category breakdown, and budgeting information; and offering one or more banking services provided by the financial institution to the non-account holder through the application to convert the non-account holder to an account holder of the financial institution, the one or more banking services comprising one or more of opening an account at the financial institution and converting an account to the financial institution.

2. The method as recited in claim 1, wherein the same full set of banking transaction types includes bill pay transactions.

3. The method as recited in claim 1, wherein the same full set of banking transaction types includes money transfer transactions.

4. The method as recited in claim 1, wherein the same full set of banking transaction types includes withdrawal transactions.

5. The method as recited in claim 1, wherein the same full set of banking transaction types includes deposit transactions.

6. The method as recited in claim 1, wherein the same full set of banking transaction types includes online banking transactions.

7. The method as recited in claim 1, wherein the same full set of banking transaction types includes investment transactions.

8. The method as recited in claim 1, wherein the same full set of banking transaction types includes wire transfer transactions.

9. The method as recited in claim 1, wherein the transaction data for the non-account holder comprises one or more of a date of a transaction, an amount of the transaction, a description of the transaction, and a category for the transaction.

10. The method as recited in claim 1, further comprising offering one or more services provided by the financial institution to the non-account holder through the application, the one or more services comprising one or more of opening an account at the financial institution, converting an account to the financial institution, converting a loan to the financial institution, switching bill pay services to the financial institution, switching direct deposit services to the financial institution, and linking external accounts to the financial institution.

11. The method as recited in claim 1, further comprising offering one or more functions for analyzing the non-account holder's transaction data from the plurality of third-party deposit accounts through the application, the one or more functions comprising determining account balances, generating and presenting a spending pie, transaction category breakdown, and budgeting information.

12. A program product comprising a non-transitory computer-readable storage medium that stores code executable by a processor, the executable code comprising code to perform:

storing an application on a computer system for a financial institution;

receiving an application download request, over the internet, at the computer system from an account holder's smart phone, the account holder having a deposit account at the financial institution;

wirelessly downloading the application to the account holder's smart phone;

automatically exposing account data of the account holder's deposit account stored on the computer system of the financial institution to the application on the account holder's smart phone;

facilitating, through the application on the account holder's smart phone, a full set of personal financial management functions by the account holder for the deposit account at the financial institution;

receiving an application download request, over the internet, at the computer system from a non-account holder's smart phone, the non-account holder not having any deposit account at the financial institution, the non-account holder having a plurality of third-party deposit accounts at a plurality of third-party financial institutions;

wirelessly downloading the application to the non-account holder's smart phone;

automatically aggregating account data of the non-account holder's plurality of third-party deposit accounts from storage on third-party computer systems for the plurality of third-party financial institutions to storage on the computer system for the financial institution, the aggregated account data comprising transaction data for the non-account holder that is received from the plurality of third-party financial institutions over the internet;

automatically exposing the aggregated account data to the application on the non-account holder's smart phone such that the non-account holder can view account data for each of the plurality of third-party deposit accounts for the non-account holder within the application;

facilitating, through the application on the non-account holder's smart phone, substantially the same full set of banking transaction types and personal financial management functions by the non-account holder for the third-party deposit account at the third-party financial institution, wherein the facilitating causes the application to present substantially the same full functionality to the non-account holder as the application presents to the account holder, the full set of personal financial management functions comprising one or more of personal budgeting, income tracking, net worth analysis, and account transaction viewing;

offering one or more functions for analyzing the non-account holder's transaction data from the plurality of third-party deposit accounts through the application, the one or more functions comprising determining account balances, generating and presenting a spending pie, transaction category breakdown, and budgeting information; and offering one or more banking services provided by the financial institution to the non-account holder through the application to convert the non-account holder to an account holder of the financial institution, the one or more services comprising one or more of opening an account at the financial institution and converting an account to the financial institution.

13. The program product as recited in claim 12, wherein the transaction data for the non-account holder comprises one or more of a date of a transaction, an amount of the transaction, a description of the transaction, and a category for the transaction.

14. The program product as recited in claim 12, wherein the code is further executable by the processor to perform offering one or more services provided by the financial institution to the non-account holder through the application, the one or more services comprising one or more of opening an account at the financial institution, converting an account to the financial institution, converting a loan to the financial institution, switching bill pay services to the financial institution, switching direct deposit services to the financial institution, and linking external accounts to the financial institution.

15. The program product as recited in claim 12, wherein the code is further executable by the processor to perform analyzing the non-account holder's transaction data from the plurality of third-party deposit accounts through the application, the one or more functions comprising determining account balances, generating and presenting a spending pie, transaction category breakdown, and budgeting information.

* * * * *